May 15, 1928.
L. R. GOLLADAY
1,669,516
AUTOMATIC RECLOSING CIRCUIT INTERRUPTER
Filed Nov. 2, 1921
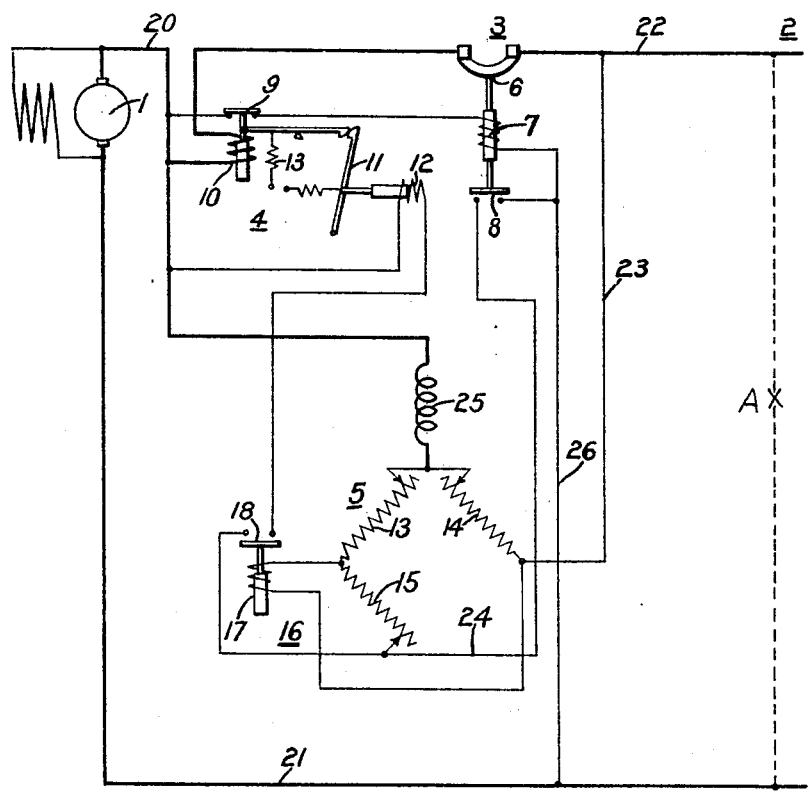
WITNESSES:
INVENTOR
Lawrence R. Golladay.
BY
ATTORNEY Patented May 15, 1928.

1,669,516

UNITED STATES PATENT OFFICE.

LAWRENCE R. GOLLADAY, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC RECLOSING CIRCUIT INTERRUPTER.

Application filed November 2, 1921. Serial No. 512,400.

My invention relates to automatic circuit interrupters and particularly to selectively reclosing circuit interrupters.

One object of my invention is to provide a circuit interrupter that shall automatically completely disconnect a circuit upon the occurrence of an overload or a short-circuit and that shall reconnect the circuit automatically when the overload or short-circuit is removed.

Another object of my invention is to provide means for controlling the reclosing of the interrupter that shall be simple and compact in construction and accurate and reliable in operation.

The occurrence of a heavy overload or short-circuit upon feeder-circuit conductors causes a current to traverse the conductors that exceeds in value the normal carrying capacity of the circuit. Upon the occurrence of such conditions, it is desirable to open a circuit interrupter to prevent the traversal of current until the heavy overload or short-circuit conditions are removed. Since the opening of the interrupter may be effected automatically upon the occurrence of such conditions, it is highly desirable that the reclosing of the interrupter may also be automatically effected when these conditions are removed.

Either a large increase in the load on a circuit or a short-circuit thereon will materially decrease the resistance of the circuit comprising the load and the feeder conductors. Conversely, a decrease in the load on the circuit or the removal of a short-circuit therefrom will increase the resistance of the circuit. By measuring the resistance of the circuit so formed and by rendering the reclosing of the interrupter dependent upon the resistance of the circuit attaining a predetermined value, the interrupter may be automatically and selectively reclosed. Inasmuch as the interrupter will not be reclosed until a predetermined resistance obtains in the circuit, all danger from excessive currents is obviated.

United States application, Serial No. 375,965, filed April 23, 1920, by J. H. Procter, and assigned to the Westinghouse Electric & Manufacturing Company, discloses an automatic reclosing circuit interrupter comprising a Wheatstone bridge for controlling the reclosing of the interrupter when the resistance of the circuit comprising the load and feeder circuit conductors exceeds a predetermined value.

United States application, Serial No. 202,344, filed November 16, 1917, by C. H. Hodgkins, and assigned to the Westinghouse Electric & Manufacturing Company, discloses an electrical switch arm comprising two coils and a contact-controlling member that is operated when one coil is energized beyond a predetermined degree to open a circuit and is latched in its open position. The second coil releases the contact-controlling member to permit the aforementioned circuit to be reclosed.

In practicing my invention, I employ the above-described relay switch which is an effective and rugged device, in combination with a plurality of resistors arranged to comprise a Wheatstone bridge. One coil of the relay switch serves as an overload coil and the second, or reset, coil is controlled by the Wheatstone bridge to effect the completion of a circuit including the closing coil of a main circuit interrupter. Thus, when the current traversing the interrupter and the overload coil of the relay device exceeds a predetremined value, the circuit of the closing coil of the interrupter is opened and the main circuit is subsequently opened by the interrupter itself. When the load resistance changes to a predetermined value, a relay, that is energized by the Wheatstone bridge, effects the energization of the reset coil of the aforementioned relay device, and the circuit of the closing coil of the main interrupter is subsequently closed. The main interrupter thereupon recloses to connect the load circuit to the supply circuit.

In order to provide a time element in the operation of the Wheatstone bridge without the use of a dash-pot on the main circuit interrupter, I provide a reactive resistor in the circuit of the Wheatstone bridge. Electrical time lag is thus obtained without the use of a mechanical expedient, such as a dash-pot.

The single figure of the accompanying drawing is a diagrammatic view of an electrical circuit embodying my invention.

Referring to the accompanying drawing, a source 1 of electromotive force supplies energy to a load circuit 2 through a circuit interrupter 3. Upon the occurrence of overload or short-circuit conditions in the load circuit 2, the circuit interrupter 3 is adapted to be opened by means of a relay device 4. When the overload or short-circuit conditions cease and the circuit becomes substantially normal, to a predetermined degree, the circuit interrupter 3 is reclosed by means of a resistance-measuring device, or Wheatstone bridge, 5.

The circuit interrupter 3 comprises a main switch 6, a closing coil 7 and an auxiliary switch 8 that is open when the main switch 6 is closed and is closed when the main switch 6 is open.

The relay device 4 comprises a switch 9, an overload coil 10, a latch 11 and a reset coil 12. When an excessive current traverses the coil 10, the switch 9 is opened and maintained in its open position by the latch 11 against the force of a tensioned spring 13. Upon the energization of the reset coil 12, the latch member is actuated to release the switch 9 to permit the reclosing thereof.

The Wheatstone bridge 5 comprises a plurality of variable resistors 13, 14 and 15 and a control relay 16. The relay 16 comprises a coil 17 and a switch 18. The coil 17 is connected across terminals of the resistors 13 and 14. The switch 18 is connected in series with the coil 12 of the relay 4 and the switch 8 of the interrupter 3 between the conductor 20 of the supply circuit and the return conductor 21. The resistor 14 is connected to the conductor 22 of the load circuit by a conductor 23, and the resistor 15 is connected to the switch 8 by a conductor 24. A reactive resistor 25 is connected between the conductor 20, of the supply circuit, and the Wheatstone bridge 5.

Upon the occurrence of a short circuit, or an overload exceeding a predetermined value, on the load circuit 2, as at A, an excessive current traverses the coil 10 of the relay device 4, and the switch 9 is thereupon opened. The holding coil 7 of the interrupter 3 is consequently de-energized, and the interrupter 3 is permitted to open, and, consequently, to close the switch 8.

Upon the closure of the switch 8, a circuit is completed that connects the resistors 13, 14 and 15 to the load circuit 2. The resistors and the circuit comprising the conductor 23, the main circuit 22, the connected load and conductors 24 and 26, comprise a Wheatstone bridge, of which the circuit including the connected load comprises one arm, the resistance of which is to be measured. The resistors 13, 14 and 15, being variable, permit adjustment to vary the operating point.

When the resistance of the connected load attains a predetermined minimum value by reason of the clearance of the short-circuit or by reason of the removal of some of the load, the relay 16 becomes sufficiently energized to close its switch 18. The reset coil 12 is thereupon energized and the switch 9 is released to recomplete the circuit of the closing coil 7 of the interrupter 3. The interrupter 3 is, consequently, reclosed to reconnect the load circuit 2 to the supply circuit.

By inserting a reactive resistor 25 in circuit with the resistors comprising the Wheatstone bridge, a time element is provided that prevents immediate operation of the Wheatstone bridge to reclose the interrupter.

My invention is not limited to the specific arrangement of the various elements as illustrated in the accompanying drawing but may be variously modified without departing from the spirit and scope of my invention as set forth in the appended claims.

I claim as my invention:

1. In an electrical distribution system, the combination with a supply circuit, a feeder circuit and a circuit-controlling device therebetween provided with a holding coil, of an overload relay responsive to the currents traversing the circuit-controlling device for controlling the circuit of the holding coil, said relay being provided with an operating and a reset coil, a Wheatstone bridge adapted to be connected to the feeder circuit to be responsive to the resistance of the load connected thereto when the circuit-controlling device opens, and an inductive resistor in circuit with the bridge to provide a time lag between the opening of the circuit-controlling device and the operation of the bridge.

2. In an electrical distributing system, the combination with a supply circuit, a feeder circuit and a circuit-controlling device therebetween, of means for opening the controlling device upon the occurrence of an overload or short-circuit on the feeder circuit, a resistance-responsive device adapted to be connected to the feeder circuit after the controlling device opens, and electrical means for providing a time lag between the opening of the controlling device and the operation of the resistance-responsive device.

3. In an electrical distributing system, the combination with a supply circuit, a feeder circuit and a circuit-controlling device therebetween, of means for opening the controlling device upon the occurrence of an overload or short circuit on the feeder circuit, a resistance-responsive device adapted to be connected to the feeder circuit after the controlling device opens, and electrical means comprising an inductive device for connecting the resistance-responsive device to the system and for providing a time lag between the opening of the interrupter and the operation of the resistance responsive device.

4. In an electrical system, the combination with two sections of a circuit, a circuit-controlling device therebetween provided with an operating coil and an overload relay for controlling the circuit of the operating coil, of a resistance-responsive device adapted to be connected to one section of the circuit, electrical means for delaying the operation of the resistance-responsive device and an electro-responsive device for controlling the operation of the overload relay.

5. In an electrical system, the combination with two sections of a circuit, a circuit-controlling device therebetween provided with an operating coil and an overload relay, provided with a latching mechanism embodying a reset coil, for controlling the circuit of the operating coil, of a Wheatstone bridge device adapted to be connected to one section of the circuit, electrical means for delaying the operation of the Wheatstone bridge device and a relay controlled by the Wheatstone bridge device for controlling the reset coil of the latching mechanism of the overload relay.

6. In an electrical system, the combination with two sections of a circuit, a circuit-controlling device therebetween provided with an operating coil and an overload relay having a latching mechanism embodying a reset coil for controlling the circuit of the operating coil, of a Wheatstone bridge device adapted to be connected to one section of the circuit, electrical means for delaying the operation of the Wheatstone-bridge device, and means for energizing the reset coil of the latching mechanism of the overload relay when the resistance of the load attains a predetermined value.

In testimony whereof, I have hereunto subscribed my name this 21st day of October, 1921.

LAWRENCE R. GOLLADAY.